United States Patent
Draper et al.

(10) Patent No.: US 6,921,519 B2
(45) Date of Patent: Jul. 26, 2005

(54) DECOMPOSITION OF FLUORINE CONTAINING COMPOUNDS

(75) Inventors: Lee Colin Draper, Flintshire (GB); John David Scott, Cheshire (GB)

(73) Assignee: Ineos Fluor Holdings Limited (GB)

( * ) Notice: Subject to any disclaimer, the term of this patent is extended or adjusted under 35 U.S.C. 154(b) by 49 days.

(21) Appl. No.: 10/466,997

(22) PCT Filed: Jan. 24, 2002

(86) PCT No.: PCT/GB02/00264

§ 371 (c)(1), (2), (4) Date: Dec. 8, 2003

(87) PCT Pub. No.: WO02/058824

PCT Pub. Date: Aug. 1, 2002

(65) Prior Publication Data

US 2004/0076569 A1 Apr. 22, 2004

(30) Foreign Application Priority Data

Jan. 24, 2001 (GB) .............................. 0101769

(51) Int. Cl.⁷ ............................................ B01D 53/68

(52) U.S. Cl. ................................ 423/240 S; 423/245.3

(58) Field of Search ......................... 423/240 S, 240 R, 423/245.3; 502/355, 415

(56) References Cited

U.S. PATENT DOCUMENTS

| | | | |
|---|---|---|---|
| 3,790,143 A | | 2/1974 | Nix |
| 3,813,852 A | * | 6/1974 | Steineke ....................... 95/131 |
| 5,108,977 A | | 4/1992 | Yoshida et al. |
| 5,151,263 A | * | 9/1992 | Okazaki et al. .............. 423/659 |
| 5,276,249 A | * | 1/1994 | Greene et al. ............... 588/316 |
| 5,283,041 A | * | 2/1994 | Nguyen et al. ........... 423/240 S |
| 5,378,444 A | * | 1/1995 | Akita et al. ............... 423/240 S |
| 5,417,934 A | | 5/1995 | Smith et al. |
| 5,417,948 A | | 5/1995 | Iwata et al. |
| 5,649,985 A | * | 7/1997 | Imamura ...................... 96/275 |
| 5,817,284 A | | 10/1998 | Nakano et al. |
| 5,879,646 A | | 3/1999 | Orihara et al. |
| 6,004,377 A | | 12/1999 | Tamata et al. |
| 6,069,291 A | * | 5/2000 | Rossin et al. ............... 588/316 |
| 6,077,482 A | | 6/2000 | Kanno et al. |
| 6,110,436 A | | 8/2000 | Scholz et al. |
| 6,602,480 B1 | * | 8/2003 | Mori ....................... 423/240 S |
| 6,673,326 B1 | * | 1/2004 | Rossin et al. ............. 423/240 S |
| 2001/0001652 A1 | * | 5/2001 | Kanno et al. ............. 423/240 S |

FOREIGN PATENT DOCUMENTS

| | | |
|---|---|---|
| EP | 0 885 648 A1 | 12/1998 |
| EP | 0 898 999 A2 | 3/1999 |
| EP | 0 916 388 A2 | 5/1999 |
| GB | 2 295 101 A | 5/1996 |
| JP | 61 204025 A | 9/1986 |
| JP | 63 200820 A | 8/1988 |
| JP | 06 047234 A | 2/1994 |
| JP | 07 39721 A | 2/1995 |
| JP | 07 265663 A | 10/1995 |

(Continued)

OTHER PUBLICATIONS

Brown, Roy S., et al., "Catalytic Control of Emissions During Semiconductor Manufacture,".

*Primary Examiner*—Ngoc-Yen Nguyen
(74) *Attorney, Agent, or Firm*—Cook, Alex, McFarron, Manzo, Cummings & Mehler, Ltd.

(57) ABSTRACT

A process for the decomposition and removal of one or more fluorine containing compounds from a first gaseous mixture comprising the one or more fluorine containing compounds and water vapour, which process comprises the stages of: (i) contacting the first gaseous mixture with a catalyst comprising an aluminium based material to produce a second gaseous mixture comprising hydrogen fluoride and carbon oxides; and (ii) removing the hydrogen fluoride from the second gaseous mixture to produce a third gaseous mixture, which is substantially free of hydrogen fluoride.

19 Claims, 1 Drawing Sheet

FOREIGN PATENT DOCUMENTS

Figure 1:
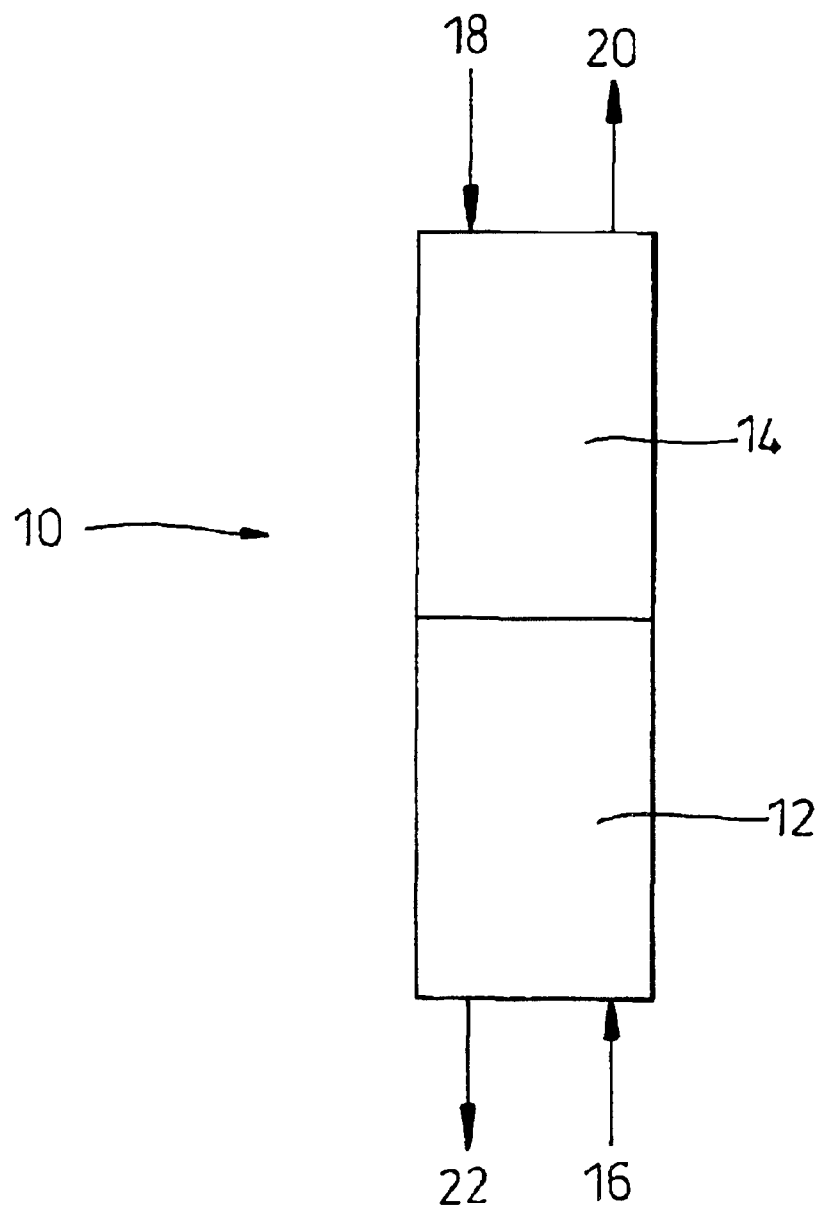

| | | |
|---|---|---|
| JP | 10 192653 A | 7/1998 |
| JP | 10 216479 A | 8/1998 |
| JP | 10 249188 A | 9/1998 |
| JP | 11 047555 A | 2/1999 |
| JP | 11 090179 A | 4/1999 |
| JP | 11 090180 A | 4/1999 |
| JP | 11 221437 A | 8/1999 |
| WO | PCT/GB02/00264 | 5/2002 |
| WO | PCT/GB02/00264 | 4/2003 |

* cited by examiner

DECOMPOSITION OF FLUORINE CONTAINING COMPOUNDS

CROSS REFERENCE TO RELATED APPLICATIONS

This application is a national stage application based upon International Application No. PCT/GB02/00264, filed Jan. 24, 2002, which claims priority from Great Britain Application No. GB 0101769.8, filed Jan. 24, 2001.

This invention relates to a catalytic abatement process for decomposing one or more fluorine containing compounds in an aqueous gaseous mixture.

Fluorine containing compounds, such as hydrofluorocarbons and perfluorocarbons, are generated as by-products in a number of different industrial processes.

For example, in the semiconductor industry perfluorocarbons are used as cleaning and etching agents in the wafer fabrication process. Generally, the perfluorocarbons are fragmented to produce fluorine species that etch the wafer surface, creating fluorine containing by-products such as $SiF_4$. However, only about 20 to 30% of the perfluorocarbon gas is actually used in the process. The perfluorocarbons that are not used in the process are often emitted into the atmosphere.

The aluminium smelting and processing industry also generates vast quantities of perfluorocarbons these processes produce significant amounts of perfluorocarbons, which are emitted into the atmosphere. The species predominantly formed are tetrafluoromethane and perfluoroethane.

Perfluorocarbons have been shown to contribute to global warming. Emissions of these gases into the atmosphere should, therefore, be avoided. One way of achieving this is to destroy the perfluorocarbons so as to produce products that are more environmentally friendly.

Several methods for the recovery and abatement of perfluorocarbons are known. These methods generally comprise combustion, catalytic and plasma based technologies. Recovery techniques generally comprise solvation, membrane and cryogenic distillation processes. Processes for the recovery of perfluorocarbons are, however, often not economically viable as the exhaust gas streams are typically dilute and typically only comprise from 2 to 3% perfluorocarbons.

U.S. Pat. No. 6,077,482 describes a process for decomposing organohalogen compounds such as chlorofluorocarbons. A catalyst comprising titania and tungsten oxide is contacted with the organohalogen compounds at a temperature of from 200 to 500° C.

JP-A-10192653 describes a process in which a gas stream containing at least one compound containing a fluorine atom and at least two carbon atoms is contacted with a catalyst containing alumina, titania, silica and zirconia in the presence of steam at a temperature of from 204 to 427° C. The catalyst activity was found to decrease over time due to the formation of aluminium fluoride.

In both these examples a wet alkaline scrubber or an alkaline filter is used to remove hydrogen fluoride by-products at the end of the process.

There are, however, a number of disadvantages associated with using wet scrubbing systems. For example, corrosion of ducting and instruments associated with the process occurs readily. Ducts also become blocked because silica forms within them. The handling of aqueous hydrogen fluoride also has a number of problems associated with it, such as safety, neutralisation and disposal. It is also necessary to ensure that heavy metals such as copper and tungsten are removed from the liquors of the aqueous scrubbing systems as they are also harmful to the environment.

The use of alumina as a catalyst to hydrolyse perfluorocarbons has also been investigated. Alumina was found to be ineffective as a catalyst because the hydrolysis reaction is inhibited due to the conversion of alumina to aluminium trifluoride (see Catalytic control of emissions during semiconductor manufacture, Brown R., Rossin J. A., SIA Semicon west 2000). Aluminium trifluoride is formed by reaction of alumina with hydrogen fluoride produced in the hydrolysis reaction.

Thus, there is a need for an improved process for the decomposition of perfluorocarbons in gaseous product streams which is simple, effective and industrially applicable.

The present invention provides a catalytic abatement process for decomposing one or more fluorine containing compounds in a gaseous mixture containing water vapour.

In the process of the present invention, firstly fluorine containing species in the gaseous mixture are hydrolysed and secondly hydrogen fluoride and other fluorine containing species are removed.

The process of the present invention is a two stage hydro-thermal treatment process for a stream comprising one or more fluorine containing compounds. In the first stage the fluorine containing compound(s) are hydrolysed using a catalyst comprising an aluminium based material, thus producing hydrogen fluoride and carbon oxides. In the second stage hydrogen fluoride is removed from the product of the first stage. This second stage may be performed using a solid comprising an aluminium based material, such as an alumina, hydrated aluminium oxide or aluminium hydroxide containing material, as a hydrogen fluoride absorbent which may be referred to or termed the second stage catalyst.

The two stage process provides a high efficiency of decomposition of the fluorine containing compounds, where destruction efficiencies of greater than 99% may be achieved. Levels of hydrogen fluoride emission are negligible. Typically, the absorption efficiency is greater than 99%. Thus, the process of the invention removes the need for aqueous scrubbing post treatments.

In a preferred embodiment of the invention, the two stage process of the invention is repeated. In other words, in this embodiment the process comprises a hydrolysis step then an absorption step which are followed by a further hydrolysis step and absorption step. The two stage process may be repeated as many times as necessary.

In another embodiment of the invention, at least part of the gaseous product of the second stage (ii) of the process is recycled to the first stage (i).

In another embodiment, the perfluorocarbon concentration in the feed stream can be concentrated prior to being fed to the two stage process. This allows the volume of gas passing through the process to be reduced, providing smaller process reactors to be used at a higher energy efficiency. A range of technologies may be used to concentrate the perfluorocarbon concentration in the feed stream including pressure swing or temperature swing adsorption/desorption, membranes, condensation and the solvent extraction of the perfluorocarbons from the gas stream to be treated. In the aluminium production industry, the use of zeolite adsorbents to trap and concentrate very dilute $CF_4$ from large gaseous vent streams may be particularly advantageous, when used with the two stage process of the present invention.

The process of the present invention can be conducted at lower temperatures that those used in alternative catalytic and combustion processes for perfluorocarbon abatement. The use of lower temperatures helps to prevent the formation of $NO_x$ by-products.

According to the present invention there is provided a process for the decomposition and removal of one or more fluorine containing compounds from a first gaseous mixture comprising the one or more fluorine containing compounds and water vapour, which process comprises the stages of (i) contacting the first gaseous mixture with a catalyst comprising an aluminium based material to produce a second gaseous mixture comprising hydrogen fluoride and carbon oxides; and (ii) removing the hydrogen fluoride from the second gaseous mixture to produce a third gaseous mixture, which is substantially free of hydrogen fluoride.

Stage (i) of the process is a hydrolysis reaction. It is, therefore, essential that the first gaseous mixture comprises water vapour. Typically, the number of hydrogen atoms provided by the water is at least equal to the total number of fluorine atoms provided by the fluorine containing compounds, i.e. at least a stoicheiometric level of water to convert all fluorine containing compounds to oxides and hydrogen fluoride.

Preferably, the water level fed to the hydrolyser in stage (i) of the process should be sufficient to fully hydrolyse 1 to 100 times the quantity of fluorine containing compounds in the first gaseous mixture. More preferably, the level of excess water should be 1.5 to 40 times, most preferably 2 to 10 times, more than the stoichiometric requirement for full hydrolysis of the fluorine containing compounds in the first gaseous mixture.

The fluorine containing compounds which may be decomposed using the process of the present invention include hydrofluorocarbons and perfluorocarbons, which may be saturated or unsaturated. The fluorine containing compounds may also contain other heteroatoms such as chlorine.

By the term "hydrofluorocarbon" we mean compounds that contain only carbon, hydrogen and fluorine atoms in their structure. By the term "perfluorocarbons" we mean compounds that contain only carbon and fluorine in their structure.

Preferably, the fluorine containing compounds such as hydrofluorocarbons and perfluorocarbons comprise from one to twelve carbon atoms, more preferably from one to six carbon atoms and still more preferably from one to four carbon atoms. Typically, the fluorine containing compounds are straight or branched chain or cyclic organic compounds.

Particularly preferred hydrofluorocarbons and perfluorocarbons include tetrafluoromethane, trifluoromethane, perfluoroethane, perfluoropropane, octafluorobutane (both isomers), pentafluoroethane (R125), difluoromethane (R32) and tetrafluoroethane (R134a). Still more preferably, the fluorine containing compound is tetrafluoromethane or perfluoroethane.

Suitable catalysts comprising an aluminium based material for use in the first stage of the process of the invention include aluminium oxide (alumina), hydrated aluminium oxide, aluminium hydroxide, aluminium oxyfluoride and aluminium fluoride.

The operating catalyst typically has a surface area of 5 $m^2/g$ or greater, preferably 10 $m^2/g$ or greater and more preferably 20 $m^2/g$ or greater. It is most preferred that the catalyst has a surface area of 40 $m^2/g$ or greater. As the hydrolysis conditions cause a progressive loss of surface area, the preferred catalysts comprising an aluminium based material have an initial surface area of 5 $m^2/g$ or greater, more preferably 50 $m^2/g$ or greater. The preferred catalysts comprising an aluminium based material also have a high thermal stability in the high temperature hydrolysis conditions and in the presence of water and hydrogen fluoride gases.

Suitable absorbents comprising an aluminium based material for use in the second stage of the process of the invention include aluminium oxide (alumina), hydrated aluminium oxide, aluminium hydroxide and aluminium oxyfluoride. Preferably the absorbent used in the second stage has a high surface area. The use of absorbents having a surface area of at least 50 $m^2/g$ is preferred. For example, alumina having a surface area of 200 $m^2/g$ or greater can be used.

In a preferred embodiment of the process, the same aluminium based material may be used in the first stage and the second stage. In this case, the same aluminium based material may be used in the second stage before it is used in the first stage. Thus, it is not essential for the aluminium based material used in the first stage to be "fresh" ie, it may be contaminated to some extent with, for example, hydrogen fluoride, or be partly converted to aluminium fluoride.

Preferably, the aluminium based materials used possess sufficient thermal stability to retain a surface area of 20 $m^2/g$ or greater in the stage (i) hydrolysis reactor and thus provide sustained high levels of fluorocarbon destruction.

The aluminium based material used in either stage (i) or stage (ii) may be subjected to pre-treatment prior to use. For example, the aluminium based material may be pre-treated by being subjected to thermal or hydrothermal treatments. Hydrothermal treatment is especially favourable for aluminium based materials with high fluoride contents, as high temperature steam treatments increase the surface oxide contents and the associated fluorochemical hydrolysis activity of the aluminium based material.

Steam increases the oxide level on the aluminium based material and hence increases the activity of the material as a catalyst. For example, steam passed over a catalyst comprising an aluminium based material introduces oxides into the structure. Thus, stream treatment can be considered to be an activation step that increases the performance of the catalyst. Steam can also be used to regenerate a previously used catalyst. Additionally, steam can be used to recover a heavily fluorinated catalyst and to recover the catalyst from an upset condition.

During steam treatment water vapour is passed through the catalyst bed. This is typically carried out at a temperature of greater than 500° C., preferably from 600 to 800° C. The steam treatment typically takes from 1 to 60 minutes, preferably about 10 minutes, at 700 to 750° C.

Stage (i) of the process of the invention is typically conducted at a temperature of 450° C. or more, and preferably at a temperature of from 500 to 1000° C., more preferably at a temperature of from 650 to 800° C., for example at about 700 to 750° C.

Stage (i) of the process of the invention can be carried out at atmospheric, subatmospheric or superatomospheric pressure. Preferably, stage (i) is carried out at atmospheric pressure or at a pressure a little above or below atmospheric pressure.

Stage (i) of the process produces hydrogen fluoride and carbon oxides. Operation of the unit at sub-atmospheric pressure reduces the risk of gaseous emissions from the reaction zone, which contains toxic hydrogen fluoride and carbon monoxide gases.

Typically, stage (i) of the process of the present invention provides a 99% conversion of the perfluorocarbons and hydrofluorocarbons.

High proportions of carbon monoxide may be formed in the hydrolysis of hydrofluorocarbons and higher molecular weight perfluorocarbons. Air may be added to the first gaseous mixture in order to reduce the level of carbon monoxide formed. The air oxidises the carbon monoxide to carbon dioxide, which can be released into the atmosphere without further treatment.

The efficacy of stage (i) of the process may be increased by the addition of additives to the catalyst comprising an aluminium based material. Suitable additives include the metals of Groups 4 to 14 of the periodic table of elements and compounds comprising one or more metals from these groups. These improve alumina hydrothermal stability and thus surface area retention in the hydrolysis reactor of stage (i). Zinc oxide is an example of a useful alumina stabiliser for the process of the invention. Redox metals within the above Groups also increase the carbon monoxide oxidation rates in the process. Iron or compounds of iron are preferred. For example, oxides, hydroxides or hydrated oxides of iron may be mixed with the catalyst comprising an aluminium based material.

The reference to Groups 4 to 14 of the periodic table of the elements refers to the new IUPAC version of the periodic table of elements.

For example, zinc or a zinc compound such as zinc oxide can be added to the catalyst in order to improve hydrolysis. For example, the use of zinc or a zinc containing compound may increase surface area stability and thus increase the length of time for which the catalyst is active. Iron or an iron containing compound can be added to increase carbon monoxide oxidation rates. Suitable iron containing compounds include iron oxides, such as $Fe_2O_3$.

A particularly preferred catalyst comprises zinc and $Fe_2O_3$ on an aluminium oxyfluoride support. Another preferred catalyst comprises zinc on an alumina support.

Another particularly preferred catalyst is an aluminium based catalyst comprising an aluminium oxide, hydrated aluminium oxide, aluminium hydroxide, aluminium oxyfluoride or aluminium fluoride, with a surface area of 50 $m^2/g$ or greater and a pore volume of 0.3 cc/g or greater. The surface area of the catalyst is located in the pores, which have a diameter of 40 Å or greater, preferably 50 Å or greater. Preferred alumina based catalysts have a combined alkali and alkaline earth metal content of less than 1% w/w, more preferably less than 0.5% w/w.

Water vapour can be injected into the first gaseous mixture in order to promote hydrolysis.

In stage (ii) of the process of the invention, the hydrogen fluoride can be removed from the second gaseous mixture by any suitable method. For example hydrogen fluoride can be removed using methods well known in the art such as water scrubbing, aqueous alkali scrubbing, reaction with alkaline metal earth metal oxides and absorption into an amine hydrohalide, a glycol or sulphuric acid.

In a preferred aspect of the present invention, hydrogen fluoride may be removed from the second gaseous mixture by contacting it with an absorbent comprising an aluminium based material, such as aluminium oxide, hydrated aluminium oxide, aluminium hydroxide or aluminium oxyfluoride. Alumina based materials with low silica contents are preferred, as such materials limit the amount of volatile fluorine containing compounds of silicon entering the process vent stream.

The aluminium based material used in the second stage may be subjected to pre-treatment prior to use. For example, steam treatment, as described above, may be used.

Preferably, the second gaseous mixture is contacted with the absorbent comprising an aluminium based material at a temperature of 500° C. or less, more preferably 400° C. or less and most preferably at a temperature of from 275 to 375° C., for example, 350° C. It is preferred that stage (ii) of the process is conducted at a temperature below the temperature at which stage (i) is conducted.

The second stage of the process of the invention may be carried out at atmospheric, subatmospheric or superatmospheric pressure. Preferably, the second stage is carried out at atmospheric pressure or at a pressure a little above or below atmospheric pressure. Preferably, the second stage of the process of the invention is carried out at the same pressure or a similar pressure to the first stage of the process.

The same aluminium based material may be used in both stages (i) and (ii) of the process of the invention. It is preferred that the aluminium based material used in stage (ii) is also used as the aluminium based material for stage (i). This can be achieved by using a moving bed to move the aluminium based material from the reaction zone for stage (ii) to the reaction zone for stage (i). In this example, the bed moves in a direction counter-current to the gas flow.

In an alternative embodiment, in stage (ii) of the process the hydrogen fluoride may be removed from the second mixture by absorbing the hydrogen fluoride using a conventional alkali or water scrubber.

The reaction residence time for each stage of the process of the invention is preferably up to about 40 seconds, preferably from 0.1 to 10 seconds, and more preferably from 0.2 to 5 seconds under reaction conditions.

The process of the invention may comprise a third stage (iii) in which materials other than fluorine containing organic entities can be removed from the first gaseous mixture in a pre-treatment step before the first gaseous mixture is subjected to stage (i). For example, other fluorine containing compounds such as non-organic fluorine containing compounds, for example $SiF_4$ and $WF_6$ can be removed. These materials can be removed using methods that are conventional in the art such as by the use of water scrubbers.

Alternatively, inorganic fluorine containing compounds can be removed from a gaseous mixture comprising these compounds and one or more organic fluorine containing compounds by passing the gaseous mixture over an aluminium based material. Suitable aluminium based materials include those described above, for example, aluminium oxide (alumina), hydrated aluminium oxide, aluminium hydroxide, aluminium oxyfluoride and aluminium fluoride. These aluminium based materials may contain additives as described above.

The inorganic fluorine containing compounds may be removed from the first gaseous mixture by hydrolysis to an oxide or oxyfluoride, where the inorganic compound is deposited on a solid comprising aluminium oxide, hydrated aluminium oxide, aluminium hydroxide, aluminium oxyfluoride or aluminium fluoride. The inorganic fluorine containing compound may be deposited on the aluminium based material used in stage (i). The inorganic fluorine containing compound is typically deposited on the aluminium based material at a temperature below 800° C., for example from 0 to 500° C., and a lower temperature than that at which stage (i) is conducted.

The stage for removing the inorganic fluorine containing compounds is preferably used as a pre-treatment step in combination with the two stage process of the present invention. Thus, the present invention also provides a three stage process comprising pre-treatment of the first gaseous mixture to remove inorganic fluorine containing compounds followed by the two stage process described above.

Preferably, the stage for removing inorganic fluorine containing compounds is conducted at a temperature of from 100 to 800° C., more preferably from 200 to 500° C. When this process is carried out in combination with the two stage process of the invention the temperature at which this process is carried out is typically lower than that used in the first stage (i) of the two stage process.

The reaction residence time of stage (iii) is preferably from 0.1 to 30 seconds.

The stage for removing inorganic fluorine containing compounds is typically carried out at atmospheric, subatmospheric or superatmospheric pressure. Preferably atmospheric pressure or a pressure a little above or below atmospheric pressure is used. If this stage is carried out in combination with the two stage process described above this stage (iii) is preferably carried out at the same or similar pressure as used in the first stage of the two stage process, more preferably at the same or similar pressure as used in both stages of the two stage process.

When the stage (iii) for removing inorganic fluorine containing compounds is carried out in combination with the two stage process described above the aluminium based material used in stage (iii) is preferably the same as that used in one or both of the other two stages. Most preferably, the same aluminium based material is used in all three stages. In this case, spent aluminium based material from stages (i) and (ii) can be used in the process for removing non-organic fluorine containing compounds.

It is preferred that at least a proportion of the gas vented from stage (ii) of the process is recycled to the reaction zone for stage (i) and/or stage (iii).

The apparatus that may be used to carry out the processes of the present invention may employ a moving bed of aluminium based material, which moves counter current to the gas flow. Preferably the moving bed will pass through the reaction zones for both stages of the two stage process. If the stage for removing inorganic fluorine containing compounds is also used, the moving bed will preferably also pass through the reaction zone for this stage. Thus, in a preferred embodiment the aluminium based material initially passes through the reaction zone for the second stage (ii) of the process and then through the reaction zone for the first stage (i) of the process and then, optionally, through the reaction zone for the stage (iii) for removing inorganic fluorine containing compounds.

It will be appreciated that when a three stage process is used, stages (i) and (ii) may be repeated as described above. Also, when a three stage process is used the gaseous product from stage (ii) may be recycled either into the reaction zone for stage (i) or into the reaction zone for stage (iii).

An example of a suitable apparatus in which the two stage process of the present invention may be conducted will now be described, by way of non-limiting example, with reference to FIG. 1.

FIG. 1 shows an apparatus suitable for use in the process of the present invention. Using the apparatus of FIG. 1 the same aluminium based material is used for both stages (i) and (ii) of the process.

The apparatus (10) comprises first and second reaction zones, (12) and (14). A first gaseous mixture comprising one or more fluorine containing compounds and water vapour is fed into the first reaction zone (12) at inlet (16). This mixture passes through the first reaction zone (12) and then through the second reaction zone (14).

Whilst the first gaseous mixture is fed into the apparatus, a catalyst comprising an aluminium based material is fed into the second reaction zone (14) at inlet (18). The direction in which the aluminium based material flows is opposite to that in which the first gaseous mixture flows. The aluminium based material passes through the second reaction zone (14) and then the first reaction zone (12) and contacts the first gaseous mixture.

As the first gaseous mixture passes through the two reaction zones, it contacts the aluminium based material so that fluorine containing species are decomposed and removed. In the first reaction zone the hydrofluorocarbons and/or perfluorocarbons are decomposed. In the second reaction zone, the hydrogen fluoride is removed. Gas substantially free of fluorine containing species exits the apparatus (10) at exit (20). The spent aluminium based material exits the apparatus (10) at exit (22).

The spent aluminium based material, from the two stage process or the process for removing non-organic fluorine containing compounds, may either be reprocessed or disposed of. It is especially preferred to recycle the aluminium based material when the catalytic abatement process is used in the aluminium industry where the recycled materials can be fed into smelters.

The process is exemplified but not restricted by the following examples.

EXAMPLE 1

Stage (i) of the Process of the Invention

A hydrolysis catalyst comprising an aluminium based material was prepared using alumina with a pore volume of greater than 0.3 cc/g and a surface area of greater than 50 m$^2$/g in pores of greater than 50 Å. The alumina was supplied by Engelhard and was coded Al-3996-R. The alumina had a surface area of 200 m$^2$/g and a pore volume of 0.75 cc/g. The alumina was chosen to be low in alkali metal content, having a sodium content of 0.01 % w/w.

The alumina catalyst thus formed was then used as a catalyst for a process corresponding to stage (i) of the process of the present invention.

The solid extrudate was crushed and sieved to generate alumina particles having a particle size of from 0.5 to 1.5 mm. The alumina particles were packed into an inconel reaction tube with an internal diameter of 8 mm and located in a tube heater to provide a stage (i) reactor. The alumina had a packed bed density of 0.59 g/cc. A stream of nitrogen was saturated in water at 20° C. and combined with a stream of carbon tetrafluoride to make a gas mixture containing 5000 parts per million of carbon tetrafluoride by volume. The $H_2O:CF_4$ feed ratio was estimated to be approximately 20000:5000 by volume, which was double the water requirement for the stoichiometric hydrolysis reaction of $CF_4$ to $CO_2$.

The moist nitrogen and $CF_4$ gas mixture was passed over the alumina catalyst at atmospheric pressure, and the stage (i) reactor was then heated to 700° C. The contact time of the reaction gas mixture under the 700° C. reaction conditions was 4.4 seconds. After 12 hours of reaction, the levels of $CF_4$, $CO_2$ and HF in the vent stream were measured and the $CF_4$ hydrolysis efficiency was calculated to be greater than 90%. After the 12 hours of reaction, less that 5% of the HF hydrolysis product was absorbed on the stage (i) alumina catalyst. The catalyst in the high temperature hydrolysis reactor was calculated to have a low HF absorption efficiency with less than 10% of the aluminium oxide content converting to $AlF_3$.

EXAMPLE 2

Stage (ii) of the Process of the Invention

A second inconel reactor was charged with 0.5 to 1.5 mm particles of Engelhard Al-3996-R alumina to provide a stage (ii) reactor. The reactor was heated to 250° C. and connected to the vent gas line from the stage (i) reactor of Example 1. The level of HF in the gases vented from the stage (ii) reactor was low, indicating that the HF absorption efficiency was 99.4%, when using a contact time of 1.2 seconds. After 15 hours of operation the HF absorber efficiency decreased sharply and after 20 hours the absorbent failed to absorb additional HF. The alumina in the absorption stage was calculated to have a high HF absorption efficiency with greater than 60% of the aluminium oxide content converting to $AlF_3$.

EXAMPLE 3

Stage (ii) of the Process of the Invention

The spent absorbent was discharged from the stage (ii) reactor and was replaced by an identical fresh alumina charge of Engelhard Al-3996-R alumina. The stage (ii) reactor was heated to 150° C. and connected to the vent gas line from the stage (i) reactor operating at 700° C., as described in Example 1. The $CF_4$ hydrolysis efficiency of the first stage reactor remained high, with above 90% of the $CF_4$ being converted to $CO_2$ and HF. The HF absorption efficiency of the stage (ii) alumina charge was found to be 99.4% over the first 10 hours of reaction, when using a contact time of 1.4 seconds. After 13 hours of operation, the stage (ii) alumina bed was exhausted and failed to absorb significant additional levels of the HF produced in stage (i). The aluminium oxide in stage (ii) had been 34% converted to $AlF_3$.

EXAMPLE 4

Stages (i) and (ii) of the Process of the Invention

The reactors used in Example 3 were emptied and the exhausted absorbent from the stage (ii) reactor was placed into the stage (i) hydrolysis reactor. The stage (ii) absorbent charge was replaced, using a repeat charge of fresh Engelhard Al-3996-R alumina. The temperature of the stage (i) reactor was raised to 750° C. and the stage (ii) absorber was heated to 250° C., whilst passing a water saturated nitrogen stream containing 2500 ppm by volume of $CF_4$. The $H_2O:CF_4$ feed ratio was estimated to be approximately 20000:2500 by volume, which was four times the water requirement for the stoichiometric hydrolysis reaction of $CF_4$ to $CO_2$. The contact times employed under reaction conditions were 2.1 seconds in stage (i) and 4.2 seconds in stage (ii), where equal volumes of solid were charged to both stages of the process. After 100 hours of operation, the $CF_4$ destruction efficiency was maintained at greater than 90%, using the cascaded spent alumina absorbent. The HF absorption efficiency was found to be 99.6%, prior to exhaustion of the HF absorption capacity. The stage (ii) charge of aluminium oxide was found to convert 70% to $AlF_3$ in this study.

EXAMPLE 5

Stages (i) and (ii) of the Process of the Invention

Equal masses of the fresh alumina catalyst detailed in Example 1 were charged to the two stages of the process. The stage (i) reactor was then heated to 750° C. and the stage (ii) reactor was heated to 350° C., whilst passing a water saturated nitrogen stream containing 2500 ppm by volume of $CF_4$, as described in Example 4. The contact time in the first hydrolysis reaction stage was 2.1 seconds and the contact time in the second stage HF absorber was 3.5 seconds under reaction conditions. The two stage $CF_4$ destruction process was operated until the second stage alumina absorbent was exhausted and the hydrolysis HF appeared in the vent from the second reaction stage. The two stage reactor system was operated for 92 hours and the $CF_4$ destruction efficiency was sustained above 99.5%. The HF absorbed by the two stage process was sufficient to convert 66% of the second stage aluminium oxide to $AlF_3$.

EXAMPLE 6

Stages (i) and (ii) of the Process of the Invention

The two reactors used in Example 5 were emptied and the spent absorbent was transferred to the stage (i) hydrolysis reactor. The stage (ii) absorber was recharged with fresh alumina as described in Example 5. The stage (i) reactor was then heated to 750° C. and the stage (ii) reactor was heated to 400° C., whilst passing a water saturated nitrogen stream containing 2500 ppm by volume of $CF_4$, as described in Example 4. The contact time in the first hydrolysis reaction stage was 2.1 seconds and the contact time second stage HF absorber was 3.2 seconds under reaction conditions. The two stage reactor system was operated for 50 hours and the $CF_4$ destruction efficiency was sustained above 99.0%. The HF absorbed by the two stage process was sufficient to convert only 22% of the second stage aluminium oxide to $AlF_3$.

What is claimed is:

1. A process for the decomposition and removal of one or more fluorine containing compounds from a first gaseous mixture comprising the one or more fluorine containing compounds and water vapour, which process comprises the stages of:
   (i) contacting the first gaseous mixture with a catalyst comprising an aluminium based material to produce a second gaseous mixture comprising hydrogen fluoride and carbon oxides; and
   (ii) contacting the second mixture with an absorbent comprising an aluminium based material to remove hydrogen fluoride from the second gaseous mixture and to produce a third gaseous mixture, which is substantially free of hydrogen fluoride;
   wherein the aluminium based material used in stage (i) has previously been used in stage (ii).

2. A process according to claim 1, wherein at least one of the fluorine containing compounds is a hydrofluorocarbon or a perfluorocarbon.

3. A process according to claim 2, wherein the hydrofluorocarbon or perfluorocarbon has a carbon chain length of from one to four.

4. A process according to claim 2, wherein the hydrofluorocarbon or perfluorocarbon is tetrafluoromethane, trifluoromethane, perfluoroethane, perfluoropropane, octafluorobutane, pentafluoroethane, difluoromethane or tetrafluoroethane.

5. A process according to claim 4, wherein the perfluorocarbon is tetrafluoromethane or perfluoroethane.

6. A process according to claim 1, wherein the aluminium based material initially comprises aluminium oxide, hydrated aluminium oxide, aluminium hydroxide or aluminium oxyfluoride.

7. A process according to claim 1, wherein stage (i) is conducted at a temperature in the range of from 500 to 1000° C.

8. A process according to claim 1, wherein the aluminium based material comprises at least one metal or compound of a metal of Groups 4 to 14 of the periodic table.

9. A process according to claim 1, wherein stage (ii) is conducted at a temperature of from 100° C. to 500° C. and below the temperature of stage (i).

10. A process according to claim 1, wherein a moving bed moves the aluminium based material from the reaction zone for stage (ii) to the reaction zone for stage (i) in a direction counter-current to the gas flow.

11. A process according to claim 1, wherein the gas residence time in each stage of the process is from 0.1 to 40 seconds.

12. A process according to claim 1, further comprising stage (iii) in which at least one inorganic fluorine-containing compound is removed from the first gaseous mixture by deposition on a solid comprising an aluminium based material.

13. A process according to claim 12, wherein the solid used in stage (iii) comprises aluminium oxide, hydrated aluminium oxide, aluminium hydroxide, aluminium oxyfluoride or aluminium fluoride.

14. A process according to claim 12, wherein stage (iii) is conducted at a temperature of from 0 to 800° C. and the reaction residence time is from 0.1 to 30 seconds.

15. A process according to claim 12, wherein the solid used in stage (iii) has previously been used in stage (i).

16. A process according to claim 15, wherein stage (iii) is conducted at a temperature of from 0 to 500° C. and a lower temperature than that at which stage (i) is conducted.

17. A process according to claim 16, wherein a moving bed moves the aluminium based material from the reaction zone for stage (ii) to the reaction zone for stage (i) and then to the reaction zone for stage (iii).

18. A process according to claim 1, wherein the aluminium based material is activated or reactivated by treatment with steam.

19. A process according to claim 12, wherein at least a proportion of the gas vented from stage (ii) is recycled to the reaction zone for stage (i) and/or stage (iii).

* * * * *